(12) United States Patent
Fang et al.

(10) Patent No.: US 12,539,607 B2
(45) Date of Patent: Feb. 3, 2026

(54) ROBOT PROGRAMMING

(71) Applicant: Intrinsic Innovation LLC, Mountain View, CA (US)

(72) Inventors: Jingyi Fang, Cupertino, CA (US); Charles Marc Gobeil, Newark, NJ (US)

(73) Assignee: Intrinsic Innovation LLC, Mountain View, CA (US)

( * ) Notice: Subject to any disclaimer, the term of this patent is extended or adjusted under 35 U.S.C. 154(b) by 97 days.

(21) Appl. No.: 18/099,066

(22) Filed: Jan. 19, 2023

(65) Prior Publication Data

US 2023/0226688 A1 Jul. 20, 2023

Related U.S. Application Data

(60) Provisional application No. 63/300,745, filed on Jan. 19, 2022.

(51) Int. Cl.
*B25J 9/16* (2006.01)
*B25J 13/06* (2006.01)

(52) U.S. Cl.
CPC ........... *B25J 9/1661* (2013.01); *B25J 9/1664* (2013.01); *B25J 9/1671* (2013.01); *B25J 13/06* (2013.01); *G05B 2219/50349* (2013.01)

(58) Field of Classification Search
CPC ...... B25J 9/1671; B25J 9/1605; B25J 9/1612; B25J 9/1669; B25J 13/06; B25J 9/0081; G05B 2219/50332; G05B 2219/50356; G05B 2219/50349; G05B 2219/39476; G05B 2219/45063; G05B 2219/40053; G05B 2219/40099; G06F 3/04845; G06F 3/0346

See application file for complete search history.

(56) References Cited

U.S. PATENT DOCUMENTS

| | | | |
|---|---|---|---|
| 10,906,188 B1* | 2/2021 | Sun | B07C 5/36 |
| 2014/0236565 A1* | 8/2014 | Kuwahara | B25J 9/1671 |
| | | | 703/22 |
| 2015/0112482 A1* | 4/2015 | Kuwahara | G06N 20/00 |
| | | | 901/50 |
| 2015/0127161 A1* | 5/2015 | Satou | B25J 9/1697 |
| | | | 700/259 |
| 2015/0323321 A1* | 11/2015 | Oumi | H04N 23/90 |
| | | | 348/136 |
| 2017/0326728 A1* | 11/2017 | Prats | H04N 13/204 |
| 2018/0257234 A1* | 9/2018 | Shimazu | B25J 9/1697 |

* cited by examiner

*Primary Examiner* — Khoi H Tran
*Assistant Examiner* — Tanner L Cullen
(74) *Attorney, Agent, or Firm* — Fish & Richardson P.C.

(57) ABSTRACT

Methods, systems, and apparatus, including computer programs encoded on computer storage media, for generating control instructions for operating a robot. One of the methods includes generating an interactive user interface that illustrates an object to be manipulated by a robot by using an end effector; receiving, within the user interface, first user input data indicating a workcell location; computing a surface normal of a surface in the workcell corresponding to the workcell location; presenting, within the user interface, a graphical representation of the surface normal corresponding to the workcell location; receiving, within the user interface, second user input data selecting the workcell location; and generating pose data for the robot using the computed surface normal and the workcell location.

20 Claims, 6 Drawing Sheets

ROBOT PROGRAMMING

CROSS-REFERENCE TO RELATED APPLICATIONS

This application claims priority to U.S. Provisional Application No. 63/300,745, filed on Jan. 19, 2022. The disclosure of the prior application is herein incorporated by reference.

BACKGROUND

This specification relates to robotics, and more particularly to robot programming. Robot programming refers to determining the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robot programming has traditionally required immense amounts of manual programming, especially in the case of using a teaching pendant to move a real robot and record its configurations, in order to meticulously dictate how the robotic components should move in order to accomplish a particular task within a workcell. In this specification, a workcell is the physical environment in which a robot will operate. Workcells have particular physical properties, e.g., physical dimensions of the workcell, locations and dimensions of obstacles or other hardware devices in the workcell and the like, that impose constraints on how robots can move within the workcell. Typically, accurate and up-to-date knowledge of the particular physical properties of the workcells is a prerequisite for robot programming that results in successful task performance by the robot.

Some of these tasks are object manipulation tasks, where a robot is programmed to utilize one or more end effectors to manipulate one or more objects. For example, to perform a grasping task a robot may utilize a grasping end effector to pick up an object from a first location, move the object to a second location, and drop off the object at the second location. While humans innately know how to correctly grasp many different objects, determining an appropriate manner to grasp an object for manipulation of that object may be a difficult task for robots.

SUMMARY

This specification describes systems and techniques that allow for developers to more easily generate control instructions for operating a robot. As one example, the techniques described in this specification allow a developer to efficiently define an effector pose for manipulation of an object by an end effector of a robot. As another example, the techniques described in this specification can use visual indication to emphasize any changes to a workcell over different time steps, thereby allowing a developer to more effectively generate robot control instructions that account for these changes.

Particular embodiments of the subject matter described in this specification can be implemented so as to realize one or more of the following advantages.

Using techniques described in this specification can dramatically reduce the amount of manual programming required in order to program robots. Some techniques described in this application allow developers to more effectively define end effector poses that facilitate custom and precise object manipulation by one or more robots that fit their needs. In some examples, developers can generate pose data for a robot with a simple click-and-drag input, e.g., as opposed to the relatively time-demanding job that is otherwise required for fully specifying a full pose (position and orientation) of the end effector with the use of a teaching pendant, or through multiple trial-and-error entries on another input device. Some other techniques described in this application can use visual indication to intuitively emphasize any changes to a workcell over different time steps. Corresponding, a developer viewing the display can generate more informed robot instructions that account for these changes.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
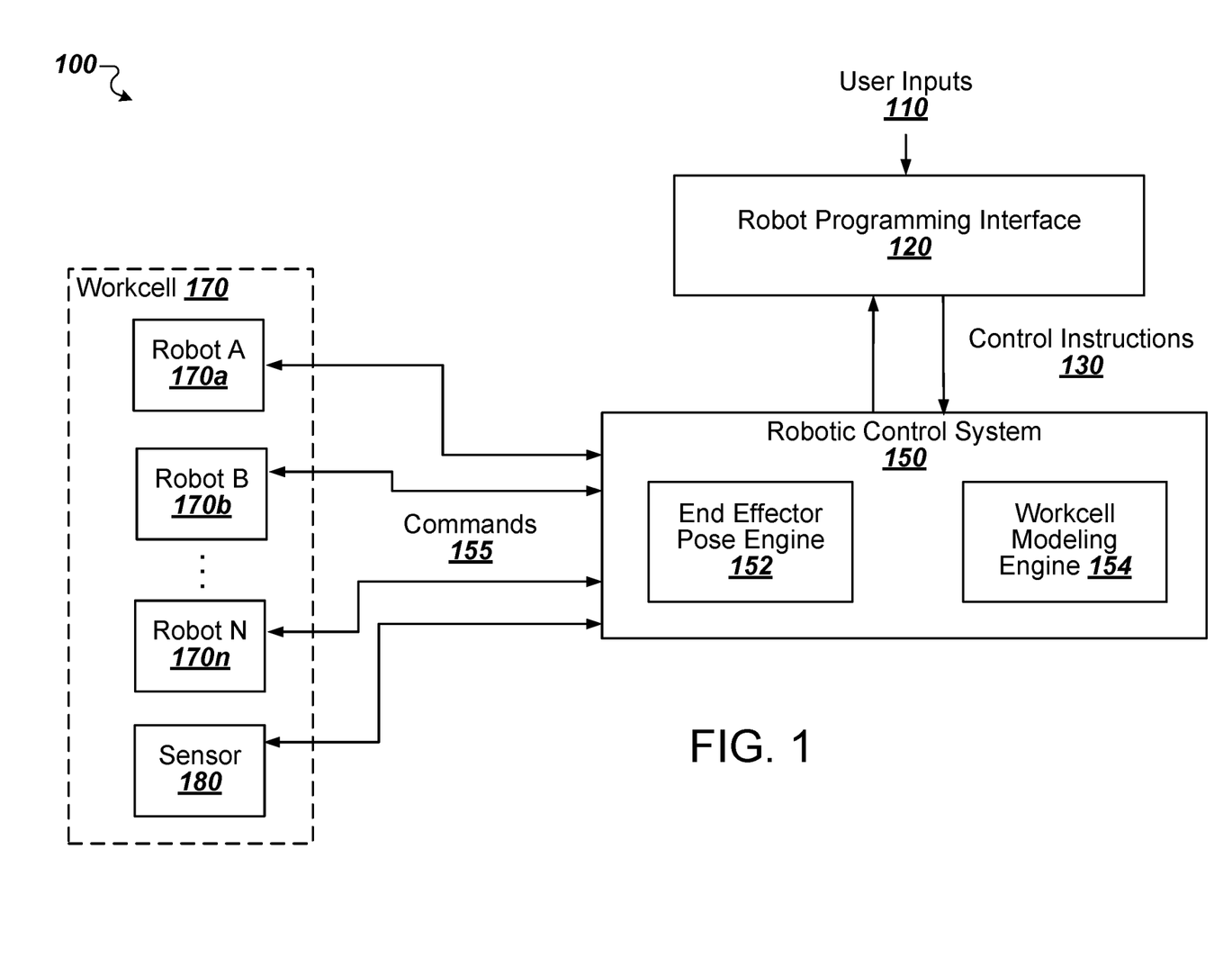
FIG. 1 is a diagram that illustrates an example system.

FIG. 1 is a diagram that illustrates an example system 100. The system 100 is an example of a system that can implement the techniques described in this specification.

The system 100 includes a number of functional components, including a robotic control system 150 that provides a robot programming interface 120 through which a developer may generate control instructions 130 for operating the robots, e.g., by identifying robot actions or writing robot control program code. Each of these components can be implemented as computer programs installed on one or more computers in one or more locations that are coupled to each other through any appropriate communications network, e.g., an intranet or the Internet, or combination of networks. The system 100 also includes a workcell 170 that includes N robots 170a-n and a sensor 180.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses.

In this specification, an end effector (also referred to as a tool) is a device that is part of and is attached at the end of the kinematic chain of the one or more moveable components of the robot. Example end effectors include grasping end effectors (e.g., grippers), welding devices, gluing devices, and sanding devices.

In this specification, a task is an operation to be performed by an end effector. For brevity, when a robot has only one end effector, a task can be described as an operation to be performed by the robot as a whole. Example tasks include grasping, welding, glue dispensing, part positioning, and surfacing sanding, to name just a few examples. Tasks are generally associated with a type that indicates the end effector required to perform the task, as well as a position within a workcell at which the task will be performed.

The robotic control system 150 is configured to control the robots 170a-n in the workcell 170. The sensor 180 is configured to capture measurements of the workcell 170. The sensor 180 can be any device that can take measurements of a current state of the workcell 170, e.g. a camera sensor, a LIDAR sensor, a distance sensor, a force sensor, an infrared sensor, or the like. As illustrated in FIG. 1, the workcell 170 only has one sensor 180. In some implementations, however, there can be multiple sensors in the workcell 170, where different sensors are of a similar or different type, in a different position in the workcell 170, and/or differently configured than the other sensors in the workcell 170. For example, each robot can have one or more sensors, and each sensor can be attached to an end of a robot arm. As another example, the sensors can be mounted on stationary or movable surfaces in the workcell 170.

The overall goal of the robot programming interface 120 is to enable the developer to more easily and accurately generate control instructions 130 for operating the robots 170a-n that allow the robots to successfully execute one or more tasks.

In this regard, the robotic control system 150 includes an end effector pose engine 152 that can generate, in cooperation with the robot programming interface 120, an end effector pose for manipulation of an object by an end effector of a robot (e.g., robot 170a, robot 170b, and/or other robots). As described herein, the end effector pose may be generated based on user inputs 110 received in response to providing an image of at least a portion of the object to the robot programming interface 120. The user inputs 110 may be generated by a developer by using one or more input devices of the system (e.g., keyboard and mouse, touch screen, or a virtual reality input device).

In this specification, a pose of an end effector references a full six-dimensional ("6D") pose of the end effector that specifies both a position and an orientation of the end effector. In some implementations, the position of the end effector may be the position of a reference point of the end effector. In some implementations, the reference point of an end effector may be a center of mass of the end effector, and/or a point near where end effector attaches to other components of the robot, though this is not required.

The end effector pose engine 152 provides a representation of a scene that includes the object for display to the robot programming interface 120 and in response, receives selection data from the developer in response to the representation provided to the developer. For example, the representation can be a virtual model of a robotic operating environment that include the object. As another example, the representation can be generated according to sensor data of a physical robotic operating environment. The selection data indicates a selected region (e.g., a selected point) of the representation by the developer. The selection data may be generated in response to at least one selection made by the developer while viewing the representation and by using one or more input devices of the system. The selection may be a click on the representation with a mouse, a single "tap" on a screen displaying the representation, a single click on the representation with a joystick, or the like, and may optionally be followed by a drag action, e.g., holding down the button of the mouse while repositioning the cursor.

A surface normal of the object can be generated and displayed by the end effector pose engine 152 once the developer clicks or taps onto the input device. In some implementations, a computer graphics model of the object of interest for robot operation (e.g., in the form of a polygon mesh) may be provided by the developer, and the surface normal can be directly computed from ray-mesh intersection. In some other implementations, the object may be captured in real time by using one or more sensors that are capable of tracking movable objects in the scene, such as a LIDAR sensor or a depth sensing camera. Specifically, to generate the pose of the end effector, the end effector pose engine 152 can determine an intersection point of a (virtual) ray from the selected region with the surface of the object in the scene characterized by the image. That is, the end effector pose engine 152 determines the location of a point on the surface of the object where a ray that casts from the selected region would intersect the object. In addition, the end effector pose engine 152 generates a normal vector of the intersection point. The normal vector, also called "surface normal," is a vector which is perpendicular to the surface at the intersection point.

In some cases, once the developer clicks or taps onto the input device, without releasing, the developer can drag in a first direction (e.g., horizontal direction) to adjust the rotation angle of a target end effector pose relative to the normal vector of the intersection point. The developer can also drag a second direction (e.g., vertical direction) to adjust the offset distance from target end effector pose to the intersection point.

In this way, the developer is essentially doing a simple click to define four degrees of freedom, and dragging to define five or six degrees of freedom for a robot pose. Defining a target frame for a point on surface of an object is reduced from an arbitrary placement of a frame to picking a point and then using a simple drag action to finalize the orientation and offset values.

The target end effector pose generally specifies a target position and a target orientation of the end effector, with respect to a reference frame, in order to perform the task. The target position of the end effector can be any point in space, defined relative to the reference frame. In some implementations, the target position of the end effector generally indicates a "point of interest" for object manipulation, such as a grasp of the object. The target orientation of the end effector in the space can be described by attaching a coordinate system to the target position and then defining the rotation angles of its coordinate axes relative to the reference frame.

In addition, the robotic control system 150 includes a workcell modeling engine 154. The workcell modeling engine 154 is programmed to generate and visualize, at the robot programming interface 120 (or a different user interface (UI) of another display device of the system), three-dimensional ("3D") scenes of the workcell 170. The workcell modeling engine 154 can employ known systems and techniques, including object detection and tracking techniques, for generating a 3D scene from sensor measurements, e.g., measurements captured by the sensor 180. The workcell modeling engine 154 also consumes robot pose information that may be reported directly by the robot controller. In this way, the workcell modeling engine 154 can pull 3D visualizations from different time steps and combine them into a single visualization of a 3D scene which reflects any changes to the workcell over these different time steps. For example, the visualization can intuitively show the difference between (i) the respective poses of the objects or the robots at a current time step and (ii) the respective poses of the objects or the robots at a preceding time step. For example, the visualization can be color coded, where objects that remain stationary and objects that have moved at least once during these time steps are assigned different colors. The visualization thus provides the developer with accurate and up-to-date knowledge of the particular physical properties of the workcells, which in turn assists the developer in generating robot control instructions that result in successful task performance by the robots.

The robotic control system 150 can execute the instructions entered by the developer through the robot programming interface 120 by issuing commands 155 to the workcell 170 in order to drive the movements of the robots 170a-n.

The robotic control system 150 can also issue commands 155 to the sensor 180. For example, the commands 155 can identify particular times at which the sensor 180 should capture certain desired observations of the workcell 170. In some implementations, the sensor 180 can also be moved within the workcell 170. For example, the sensor 180 can be attached to a robotic arm that can move the sensor to different positions throughout the workcell 180 in order to capture certain desired observations. In these implementations, the robotic control system 150 can issue commands 155 that specify an orientation and/or position of the sensor 180 for each desired observation.

Figure 2:
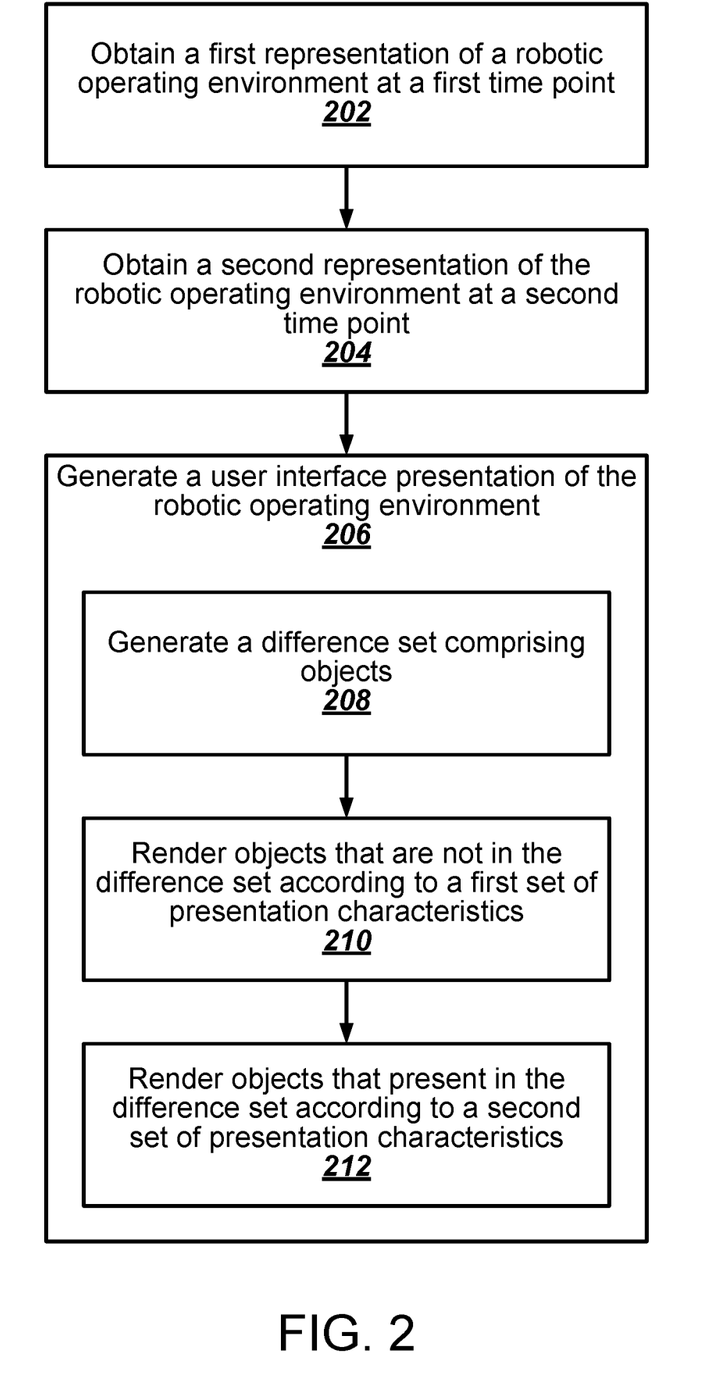
FIG. 2 is a flowchart of an example process for generating a user interface presentation of a robotic operating environment.

FIG. 2 is a flow diagram of an example process 200 for generating a user interface presentation of a robotic operating environment. For convenience, the process 200 will be described as being performed by a system of one or more computers located in one or more locations. For example, a system, e.g., the robotic control system 150 of FIG. 1, appropriately programmed, can perform the process 200.

The system obtains a first representation of a robotic operating environment at a first time point (step 202). The first representation can include data representing a first set of one or more objects in the robotic operating environment.

The system obtains a second representation of the robotic operating environment at a second time point (step 204). The second representation can include data representing a second set of one or more objects in the robot operating environment. For example, the first time point can be a current time point, and the second time point is a preceding time point that precedes the current time point.

The first and second representations can be any digital representation that characterizes the robot operating environment. In some examples, the first representation and the second representation are different versions of a virtual model of the robotic operating environment. In some examples, the first representation is a virtual model of the robotic operating environment, while the second representation is generated according to sensor data in a physical robotic operating environment. In some examples, the first representation and the second representation are both generated according to sensor data in a physical robotic operating environment. In these examples, appropriate computer graphics techniques, such as 3D reconstruction techniques, may be used to generate the representations.

The system generates a user interface presentation of the robotic operating environment (step 206). At a high level, the user interface presentation is able to use visual characteristics to emphasize any changes that have occurred within the robotic operating environment between the first and second time points.

In particular, the system generates a difference set that includes (i) objects that are present in the first set of one or more objects but absent from the second set of one or more objects, or (ii) objects that are present in the second set of one or more objects but absent from the first set of one or more objects (step 208).

The system renders objects that are not in the difference set according to a first set of presentation characteristics (step 210).

The system renders objects that present in the difference set according to a second set of presentation characteristics that are visually distinguished from the first set of presentation characteristics (step 212). For example, the user interface presentation may be color coded, and the presentation characteristics may include one or more colors, one or more fill patterns, or both.

Figure 4A:
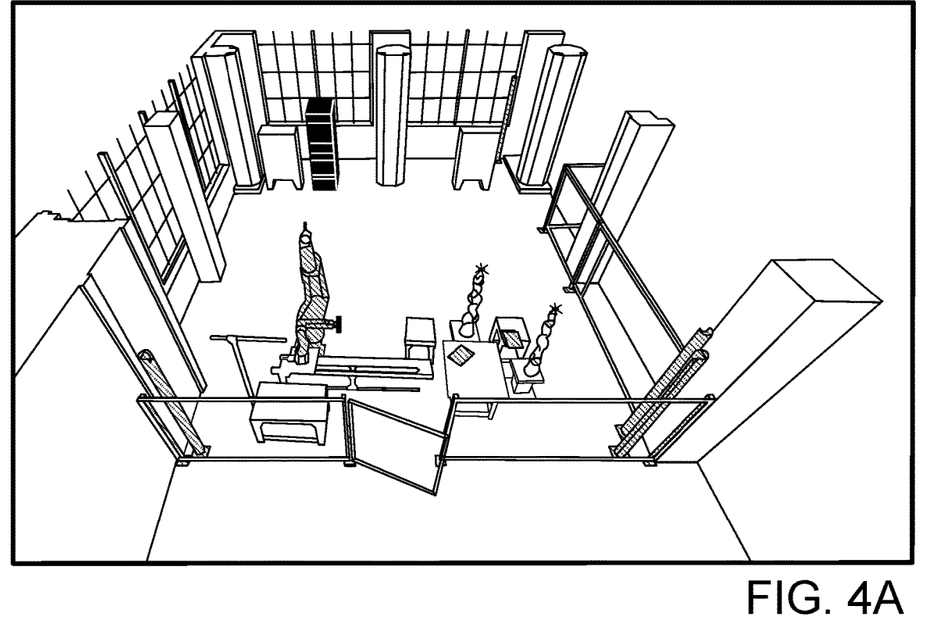
FIG. 4A-B illustrate an example a user interface presentation of a robotic operating environment.
Figure 4B:
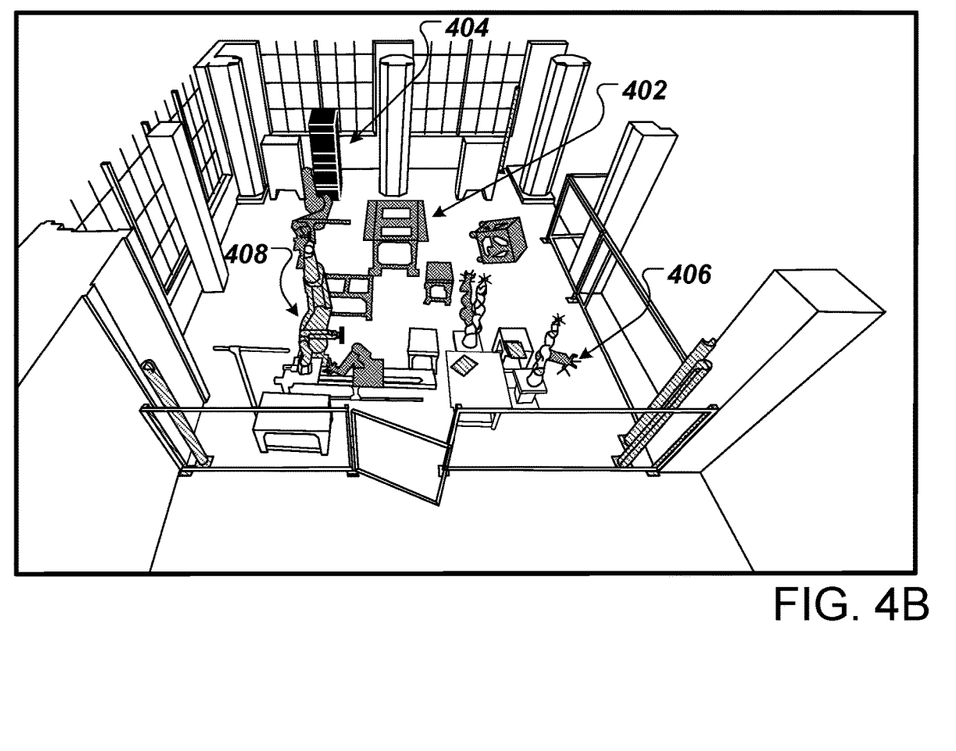

FIGS. 4A and 4B illustrate an example a user interface presentation of a robotic operating environment. In particular, FIGS. 4A and 4B illustrate example user interface presentations of the robotic operating environment at the first and second time points, respectively. In the example of FIG. 4, the workbench 402 (which is only present in the user interface presentation at the second time point) may be rendered using presentation characteristics in a way that is visually distinguished from the cabinet 404 (which is present in the user interface presentations at both the first and second time points).

In addition to or instead of emphasizing new or missing objects in the robotic operating environment, the system can similarly use visual characteristics to emphasize other changes to the environment.

In some implementations, the system determines any difference between a first pose of a robot included in the robotic operating environment at the first time point and a second pose of the robot included in the robotic operating environment at the second time point, and then generates a visual indication of the difference between the first and second poses of the robot according to a third set of presentation characteristics. In these implementations, the system can use robot configuration data that is obtained from a robot controller of the robot to determine the difference between the first and second poses of the robot. In the example of FIG. 4, the robot 406 (the pose of which has changed between the first and second time points) can be rendered using presentation characteristics in a way that is visually distinguished from the robot 408 (the pose of which has not changed between the first and second time points).

In some implementations, the system determines any difference between a first pose (a position and an orientation) of the object at the first time point and a second pose of the object at the second time point, and generate a visual indication of the difference between the first and second poses of the object according to a fourth set of presentation characteristics.

Figure 3:
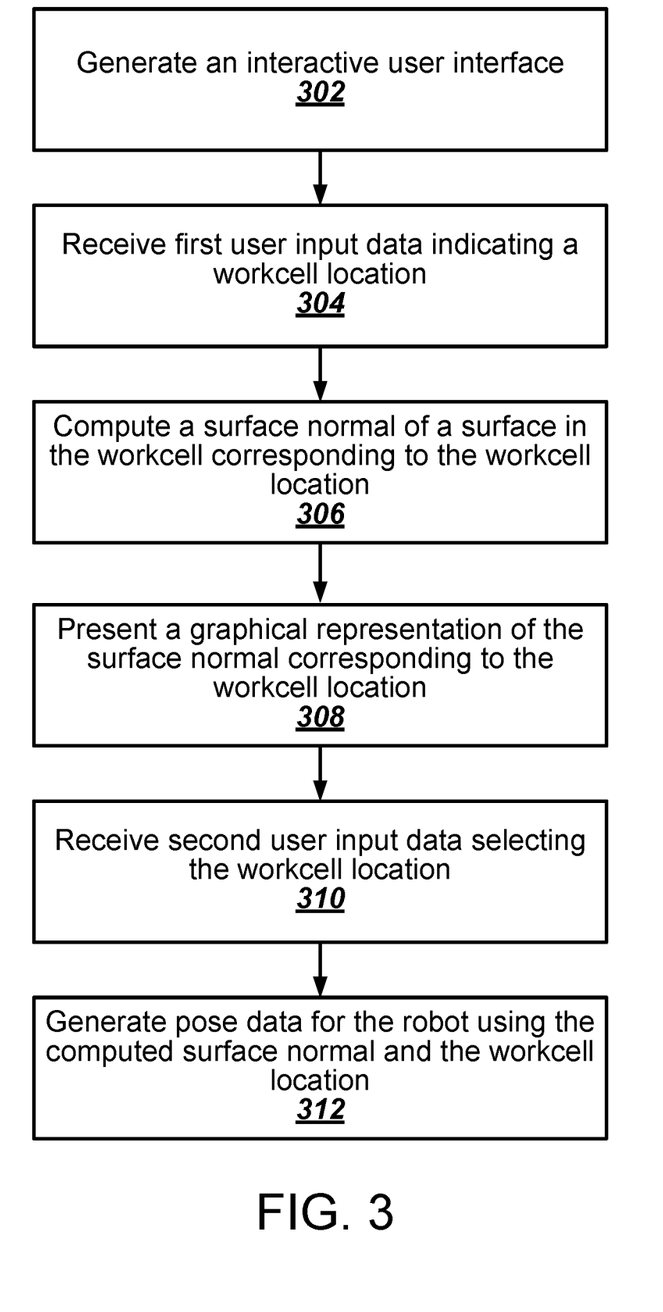
FIG. 3 is a flowchart of an example process for generating pose data for a robot

FIG. 3 is a flow diagram of an example process 300 for generating pose data for a robot. For convenience, the process 300 will be described as being performed by a system of one or more computers located in one or more locations. For example, a system, e.g., the robotic control system 150 of FIG. 1, appropriately programmed, can perform the process 300.

The system generates an interactive user interface that illustrates an object to be manipulated by a robot by using an end effector (step 302). For example, the end effector can be a grasping end effector, a welding device, or a gluing device, and the object can be a work piece.

The system receives, within the user interface, first user input data indicating a workcell location (step 304). For example, the first user input data can be entered by a user of the system by using an input device in data communication with the interactive user interface. The first user input data generally triggers the system to enter a mode for setting the robot pose.

The system computes a surface normal of a surface in the workcell corresponding to the workcell location (step 306). The surface normal points outward from the intersection point and is in a direction that is substantially orthogonal to the surface of the object. To compute the surface normal, the system can determine an intersection point on a surface of the object where a (virtual) ray that casts from the workcell location intersects with the object.

The system presents, within the user interface, a graphical representation of the surface normal corresponding to the workcell location (step 308). For example, the graphical representation of the surface normal can be in the shape of a line, an arrow, or some other symbol.

Figure 5:
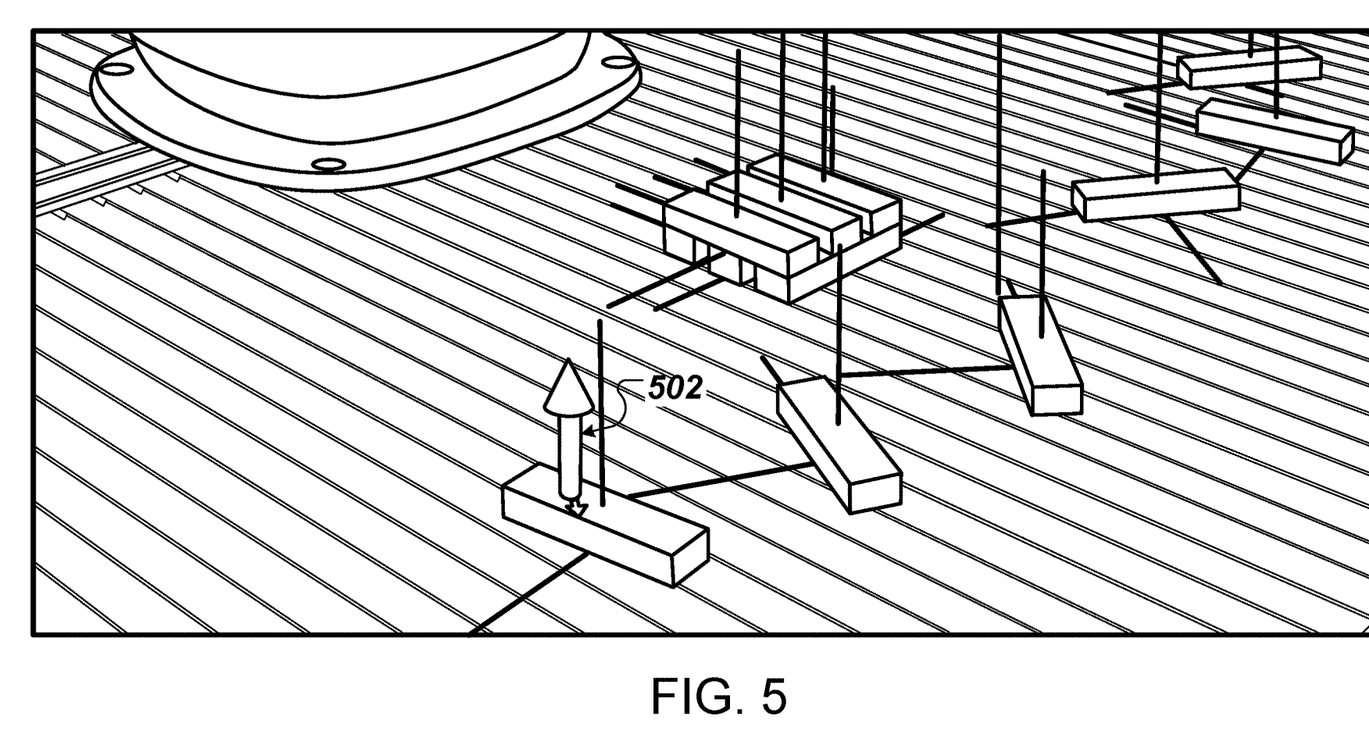
FIG. 5 illustrate an example interactive user interface for generating pose data for a robot.

FIG. 5 illustrate an example interactive user interface for generating pose data for a robot. As illustrated in FIG. 5, the system computes a surface normal following receiving the first user input data, and presents the graphical representation 502 of the surface normal. The system receives, within the user interface, second user input data selecting the workcell location (step 310). The second user input data can be a select user input (e.g., a click input).

Figure 6A:
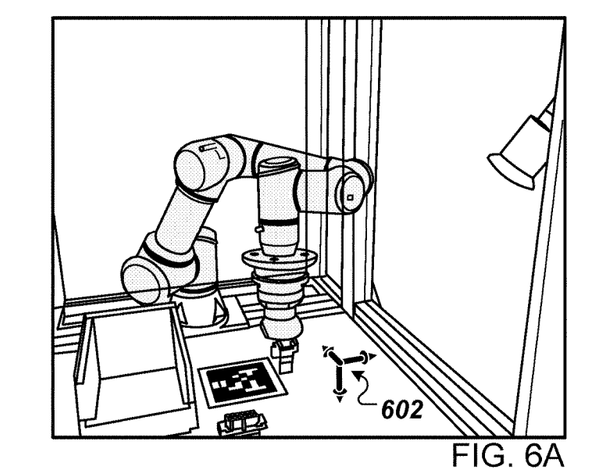
FIGS. 6A-D illustrate another example interactive user interface for generating pose data for a robot.

FIGS. 6A-D illustrate another example interactive user interface for generating pose data for a robot. As illustrated in FIG. 6A, the second user input data can select the location of 602 in the workcell.

Figure 6B:
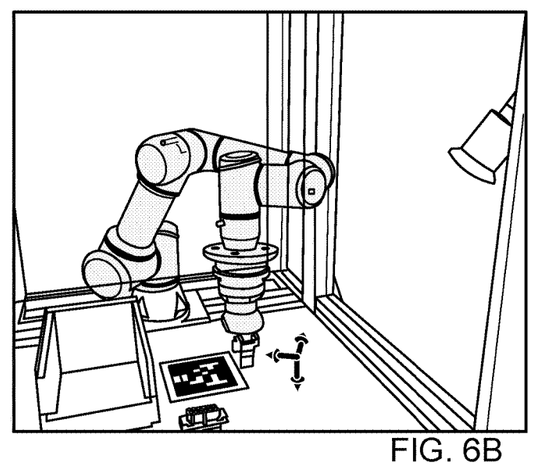
Figure 6C:
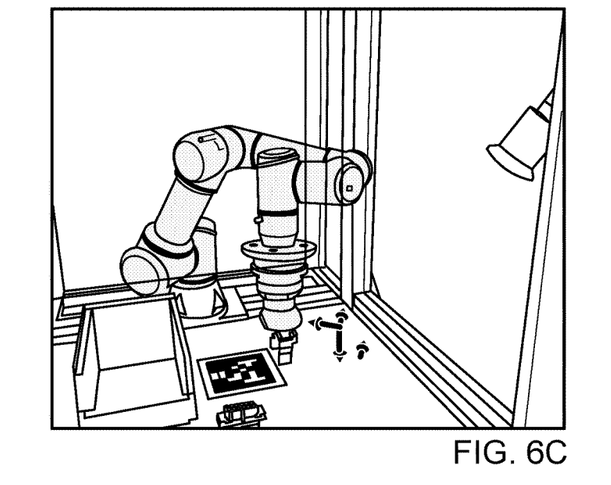

In some cases, the system also receives third user input data representing an orientation of the end effector when manipulating the object. In some cases, the system also receives fourth user input data representing an approach distance from the object. In these cases, the third user input data is a first drag user input in a first direction, and the fourth user input data is a second drag user input in a second direction, where the first direction is substantially orthogonal to the second direction. From the third and fourth user input data, the system can determine a first displacement from the workcell location in the first direction, and a second displacement from the workcell location in the second direction. As illustrated in FIGS. 6B-C, the third user input data can represent an orientation of the end effector, and the fourth user input data can represent an approach distance from the end effector to the object.

The system generates pose data for the robot using the computed surface normal and the workcell location (step 312). The pose data can include a three-dimensional representation of the workcell location and the computed surface normal of the workcell location.

The system sets six degrees of freedom of the pose data from a selection input and two drag inputs, the pose data comprising a three-dimensional position corresponding to the workcell location, the computed surface normal for the workcell location, an approach distance, and an end effector orientation.

Figure 6D:
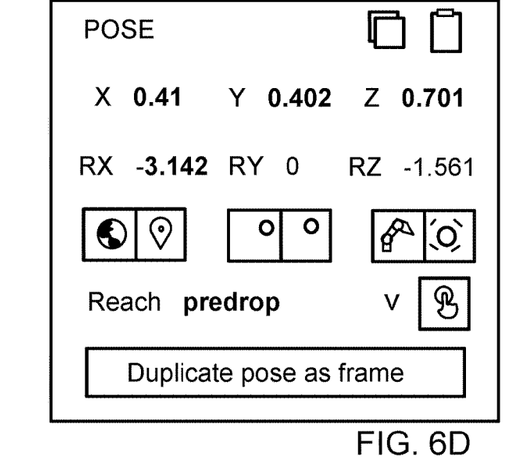

In more detail, the system can determine the end effector orientation with reference to a given reference frame from at least the first displacement and the surface normal. That is, the system can determine, from at least the first displacement and the surface normal, one or more angles of rotation of an end effector coordinate system with reference to the surface normal; and then determine the orientation of the end effector from the one or more angles of rotation. The system can determine, from the approach distance and the intersection point, an end effector position with reference to the given reference frame. In the example of FIG. 6D, the end effector orientation and the end effector position has been set to (−3.142, 0, −1.561) and (0.41, 0.402, 0.701), respectively.

In some implementations, once the six degrees of freedom of the pose data is set, the system can provide one or more control commands that cause the end effector of the robot to traverse to a six degrees-of-freedom pose defined by the pose data and perform a manipulation operation of the object subsequent to traversing to the pose.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
generating an interactive user interface that illustrates a scene of a workcell that includes an object to be manipulated by a robot by using an end effector;
generating, within the interactive user interface, a graphical representation of a surface normal vector in response to a user interaction with the interactive user interface, wherein generating the graphical representation of the surface normal vector comprises:
receiving, within the interactive user interface, first user input data indicating a workcell location;
computing the surface normal vector that points outward from a surface of an object in the workcell toward the workcell location; and
presenting, within the interactive user interface, the graphical representation of the surface normal vector that points outward from the surface of the object in the workcell toward the workcell location;
receiving, within the interactive user interface, second user input data selecting the workcell location; and
generating pose data that defines a target pose of the robot using the surface normal vector that points outward from the surface of the object in the workcell toward the workcell location.

2. The method of claim 1, wherein the pose data comprises a three-dimensional representation of the workcell location and the surface normal vector.

3. The method of claim 1, further comprising receiving third user input data representing an orientation of the end effector when manipulating the object.

4. The method of claim 3, wherein the second user input data is a select user input and wherein the third user input data is a first drag user input.

5. The method of claim 1, further comprising receiving fourth user input data representing an approach distance from the object.

6. The method of claim 5, wherein the second user input data is a select user input and wherein the fourth user input data is a second drag user input received.

7. The method of claim 6, wherein a first drag user input is in a first direction, and wherein the second drag user input is in a second direction.

8. The method of claim 7, wherein the first direction is substantially orthogonal to the second direction.

9. The method of claim 7, further comprising setting six degrees of freedom of the pose data from a selection input and two drag inputs, the pose data comprising a three-dimensional position corresponding to the workcell location, the surface normal vector, an approach distance, and an end effector orientation.

10. The method of claim 9, wherein setting the six degrees of freedom of the pose data comprises:
determining a first displacement from the workcell location in the first direction; and
determining a second displacement from the workcell location in the second direction.

11. The method of claim 10, wherein setting the six degrees of freedom of the pose data comprises:
determining the end effector orientation with reference to a given reference frame from at least the first displacement and the surface normal vector.

12. The method of claim 11, wherein determining the end effector orientation comprises:
determining, from at least the first displacement and the surface normal vector, one or more angles of rotation of an end effector coordinate system with reference to the surface normal vector; and
determining the orientation of the end effector from the one or more angles of rotation.

13. The method of claim 11, wherein setting the six degrees of freedom of the pose data comprises:
determining, from the approach distance and the intersection point, an end effector position with reference to the given reference frame.

14. The method of claim 9, wherein setting the six degrees of freedom of the pose data comprises:
determining an intersection point on a surface of the object where a ray that casts from the workcell location intersects with the object.

15. The method of claim 14, wherein the surface normal vector points outward from the intersection point and is in a direction that is substantially orthogonal to the surface of the object.

16. The method of claim 1, further comprising:
providing one or more control commands that cause the end effector of the robot to traverse to a six degrees-of-freedom pose defined by the pose data and perform a manipulation operation of the object subsequent to traversing to the pose.

17. The method of claim 1, wherein the end effector comprises a grasping end effector, a welding device, or a gluing device.

18. A system comprising:
one or more computers and one or more storage devices storing instructions that are operable, when executed by the one or more computers, to cause the one or more computers to perform operations comprising:
generating an interactive user interface that illustrates a scene of a workcell that includes an object to be manipulated by a robot by using an end effector;
generating, within the interactive user interface, a graphical representation of a surface normal vector in response to a user interaction with the interactive user interface, wherein generating the graphical representation of the surface normal vector comprises:
receiving, within the interactive user interface, first user input data indicating a workcell location;
computing the surface normal vector that points outward from a surface of an object in the workcell toward the workcell location; and
presenting, within the interactive user interface, the graphical representation of the surface normal vector that points outward from the surface of the object in the workcell toward the workcell location;
receiving, within the interactive user interface, second user input data selecting the workcell location; and
generating pose data that defines a target pose of the robot using the surface normal vector that points outward from the surface of the object in the workcell toward the workcell location.

19. The system of claim 18, wherein the operations further comprise:

providing one or more control commands that cause the end effector of the robot to traverse to a six degrees-of-freedom pose defined by the pose data and perform a manipulation operation of the object subsequent to traversing to the pose.

20. A non-transitory computer storage medium encoded with a computer program, the program comprising instructions that are operable, when executed by data processing apparatus, to cause the data processing apparatus to perform operations comprising:

generating an interactive user interface that illustrates a scene of a workcell that includes an object to be manipulated by a robot by using an end effector;

generating, within the interactive user interface, a graphical representation of a surface normal vector in response to a user interaction with the interactive user interface, wherein generating the graphical representation of the surface normal vector comprises:

receiving, within the interactive user interface, first user input data indicating a workcell location;

computing the surface normal vector that points outward from a surface of an object in the workcell toward the workcell location; and presenting, within the interactive user interface, the graphical representation of the surface normal vector that points outward from the surface of the object in the workcell toward the workcell location;

receiving, within the interactive user interface, second user input data selecting the workcell location; and generating pose data that defines a target pose of the robot using the surface normal vector that points outward from the surface of the object in the workcell toward the workcell location.

* * * * *